(12) United States Patent
Koh et al.

(10) Patent No.: US 12,017,532 B2
(45) Date of Patent: Jun. 25, 2024

(54) APPARATUS FOR OPERATING DISPLAY TYPE VEHICLE SWITCH AND METHOD THEREOF

(71) Applicants: Hyundai Motor Company, Seoul (KR); Kia Corporation, Seoul (KR); LS Automotive Technologies Co., Ltd., Gyeonggi-do (KR)

(72) Inventors: Jin Young Koh, Gyeonggi-do (KR); Jun Hwan Lee, Gyeonggi-do (KR)

(73) Assignees: Hyundai Motor Company, Seoul (KR); Kia Corporation, Seoul (KR); LS Automotive Technologies Co., Ltd., Gyeonggi-do (KR)

(*) Notice: Subject to any disclaimer, the term of this patent is extended or adjusted under 35 U.S.C. 154(b) by 143 days.

(21) Appl. No.: 17/746,576

(22) Filed: May 17, 2022

(65) Prior Publication Data
US 2023/0076211 A1    Mar. 9, 2023

(30) Foreign Application Priority Data
Sep. 6, 2021 (KR) .................. 10-2021-0118618

(51) Int. Cl.
*G06F 3/14* (2006.01)
*B60K 35/00* (2006.01)
*B60K 35/28* (2024.01)
*B60K 35/29* (2024.01)
(Continued)

(52) U.S. Cl.
CPC ............... *B60K 35/00* (2013.01); *G06F 3/14* (2013.01); *B60K 35/28* (2024.01); *B60K 35/29* (2024.01); *B60K 35/60* (2024.01); *B60K 35/81* (2024.01); *B60K 2360/167* (2024.01); *B60K 2360/191* (2024.01); *B60K 2360/77* (2024.01)

(58) Field of Classification Search
CPC .......... G09G 2380/10; G09G 2354/00; G09G 5/377; G06F 3/147; G06F 3/14; G06F 9/453; B60R 1/00; B60R 2300/307; B60R 2300/205; B60R 1/005; B60R 2300/106; B60R 2300/8053; B60R 2300/8093
See application file for complete search history.

(56) References Cited

U.S. PATENT DOCUMENTS

| 5,185,558 A | 2/1993 | Benedict et al. |
| 7,759,819 B2 | 7/2010 | Michiyama et al. |
| 2008/0100139 A1 | 5/2008 | Michiyama et al. |

(Continued)

FOREIGN PATENT DOCUMENTS

| JP | 2000-231859 A | 8/2000 |
| JP | 2008-114655 A | 5/2008 |

(Continued)

*Primary Examiner* — Hau H Nguyen
(74) *Attorney, Agent, or Firm* — Fox Rothschild LLP

(57) ABSTRACT

A display type vehicle switch operating apparatus includes a receiver that receives driving information related to an external driving situation of a vehicle and display state information of a display of the vehicle, a highlight indication information generator that generates highlight indication information of a symbol displayed on the display based on the received driving information and the received display state information, and a controller that highlights the symbol displayed on the display based on the generated highlight indication information.

20 Claims, 6 Drawing Sheets

(51) Int. Cl.
*B60K 35/60* (2024.01)
*B60K 35/81* (2024.01)

(56) References Cited

U.S. PATENT DOCUMENTS

| | | |
|---|---|---|
| 2012/0097508 A1 | 4/2012 | Son et al. |
| 2015/0085118 A1* | 3/2015 | Ahiad .................. B60S 1/0844 348/148 |
| 2017/0187963 A1* | 6/2017 | Lee ........................ G02B 27/01 |
| 2019/0241198 A1* | 8/2019 | Mori ........................ G08G 1/16 |

FOREIGN PATENT DOCUMENTS

| | | |
|---|---|---|
| KR | 100877968 B1 | 1/2009 |
| KR | 2018-0045671 A | 5/2018 |
| KR | 2021-0010111 A | 1/2021 |

\* cited by examiner

APPARATUS FOR OPERATING DISPLAY TYPE VEHICLE SWITCH AND METHOD THEREOF

CROSS-REFERENCE TO RELATED APPLICATION

This application claims under 35 U.S.C. § 119(a) the benefit of Korean Patent Application No. 10-2021-0118618, filed in the Korean Intellectual Property Office on Sep. 6, 2021, the entire contents of which are incorporated herein by reference.

BACKGROUND

(a) Technical Field

The present disclosure relates to an apparatus and a method for operating a display type vehicle switch.

(b) Description of the Related Art

In general, a switch connected to a steering wheel of a vehicle may be manufactured or used while a symbol indicating a function of the vehicle is engraved in or printed on the switch. However, when the symbol is included in the switch through this method, there is a problem in that the symbol needs to be changed by reproducing or replacing the switch itself whenever a model of the vehicle is changed or software of the vehicle is updated.

Also, when the vehicle is driving or when the vehicle is being driven by a driver inexperienced in operating the above-described switch, the operation of the switch for performing a function suitable for a driving situation may not be performed. In this case, when the suitable operation of the switch is not performed, there is a problem in that well-being of the vehicle and/or the driver of the vehicle may be compromised.

SUMMARY

An aspect of the present disclosure provides an apparatus and a method for continuously updating a symbol indicating a function using a display type switch in an apparatus for operating a switch connected to a steering wheel of a vehicle.

Another aspect of the present disclosure provides an apparatus and a method for inducing a user to operate an appropriate switch according to a driving situation of a vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for operating a display type vehicle switch may include a receiver that receives driving information related to an external driving situation of a vehicle and displays state information of a display of the vehicle, a highlight indication information generator that generates highlight indication information of a symbol displayed on the display based on the received driving information and the received display state information, and a controller that highlights the symbol displayed on the display based on the generated highlight indication information.

According to embodiments, the driving information may include at least one of visibility limit information of the vehicle, current time information, speed information of the vehicle, or information on whether one or more controllers included in the vehicle are turned on.

According to embodiments, the information on whether the one or more controllers are turned on may include at least one of information on whether a headlamp of the vehicle is turned on, information on whether a fog lamp of the vehicle is turned on, or information on whether a wiper of the vehicle is turned on.

According to embodiments, the current time information may include one of day time information or night time information, and the visibility limit information of the vehicle may include one of information indicating that a field of view is limited or information indicating that the field of view is not limited.

According to embodiments, the received display state information may include information indicating whether or not a symbol of the one or more controllers displayed on the display is highlighted.

According to embodiments, the received display state information may include one of information indicating whether a symbol for the fog lamp is highlighted or information indicating whether a symbol for the wiper is highlighted.

According to embodiments, the highlight indication information of the symbol displayed on the display may include information indicating highlighting of the symbol in response to a case where the current time information includes night time information, a case where vehicle speed information is greater than or equal to information indicating a preset value, a case where information indicating whether a vehicle headlamp is turned on includes information indicating that the headlamp is turned off, and a case where the received display state information includes information indicating that a symbol for one or more controllers is not highlighted.

According to embodiments, the highlight indication information of the symbol displayed on the display may include information indicating highlighting of the symbol for the fog lamp in response to a case where the visibility limit information of the vehicle includes information indicating that a field of view is limited, a case where the speed information of the vehicle is greater than or equal to information indicating a preset value, a case where information indicating whether the fog lamp is turned on includes information indicating that the fog lamp is turned off, and a case where information indicating whether the symbol for the fog lamp is highlighted includes information indicating that the symbol for the fog lamp is not highlighted.

According to embodiments, the highlight indication information of the symbol displayed on the display may include information indicating highlighting of the symbol for the wiper in response to a case where the visibility limit information of the vehicle includes information indicating that a field of view is limited, a case where the speed information of the vehicle is greater than or equal to information indicating a preset value, a case where information indicating whether the wiper is turned on includes information indicating that the wiper is turned off, and a case where information indicating whether the symbol for the wiper is highlighted including information indicating that the symbol for the wiper is not highlighted.

According to embodiments, the controller may highlight the symbol based on at least one of an operation of highlighting the symbol at preset time intervals, an operation of enlarging a size of the symbol, or an operation of displaying a sign for highlighting the symbol on the display.

According to an aspect of the present disclosure, a method for operating a display type vehicle switch may include receiving, by a receiver, driving information related to an external driving situation of a vehicle and display state information of a display of the vehicle; generating, by a highlight indication information generator, highlight indication information of a symbol displayed on the display based on the received driving information and the received display state information; and highlighting, by a controller, the symbol displayed on the display based on the generated highlight indication information.

According to embodiments, the driving information may include at least one of visibility limit information of the vehicle, current time information, vehicle speed information, or information on whether one or more controllers included in the vehicle are turned on.

According to embodiments, the information indicating whether the one or more controller are turned on may include at least one of information on whether a headlamp of the vehicle is turned on, information on whether a fog lamp of the vehicle is turned on, or information on whether a wiper of the vehicle is turned on.

According to embodiments, the current time information may include one of day time information or night time information, and the visibility limit information of the vehicle may include one of information indicating that a field of view is limited or information indicating that the field of view is not limited.

According to embodiments, the received display state information may include information indicating whether or not a symbol of the one or more controllers displayed on the display is highlighted.

According to embodiments, the received display state information may include one of information indicating whether a symbol for the fog lamp is highlighted or information indicating whether a symbol for the wiper is highlighted.

According to embodiments, the highlight indication information of the symbol displayed on the display may include information indicating highlighting of the symbol in response to a case where the current time information includes night time information, a case where vehicle speed information is greater than or equal to information indicating a preset value, a case where information indicating whether a vehicle headlamp is turned on includes information indicating that the headlamp is turned off, and a case where the received display state information includes information indicating that a symbol for one or more controllers is not highlighted.

According to embodiments, the highlight indication information of the symbol displayed on the display may include information indicating highlighting of the symbol for the fog lamp in response to a case where the visibility limit information of the vehicle includes information indicating that a field of view is limited, a case where the speed information of the vehicle is greater than or equal to information indicating a preset value, a case where information indicating whether the fog lamp is turned on includes information indicating that the fog lamp is turned off, and a case where information indicating whether the symbol for the fog lamp is highlighted includes information indicating that the symbol for the fog lamp is not highlighted.

According to embodiments, the highlight indication information of the symbol displayed on the display may include information indicating highlighting of the symbol for the wiper in response to a case where the visibility limit information of the vehicle includes information indicating that a field of view is limited, a case where the speed information of the vehicle is greater than or equal to information indicating a preset value, a case where information indicating whether the wiper is turned on includes information indicating that the wiper is turned off, and a case where information indicating whether the symbol for the wiper is highlighted including information indicating that the symbol for the wiper is not highlighted.

According to embodiments, the highlighting of the symbol may include highlighting the symbol based on at least one of an operation of highlighting the symbol at preset time intervals, an operation of enlarging a size of the symbol, or an operation of displaying a sign for highlighting the symbol on the display.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
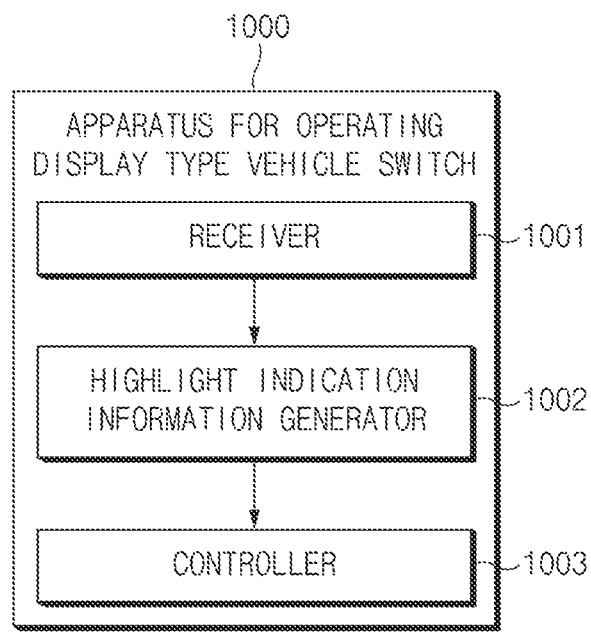
FIG. 1 shows an example of an apparatus for operating a display type vehicle switch according to embodiments.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present disclosure will be described below in detail with reference to FIGS. 1 to 6.

FIG. 1 is a block diagram illustrating an example of an apparatus 1000 for operating a display type vehicle switch (or apparatus) according to embodiments of the present disclosure.

The display type vehicle switch (or switch) according to embodiments may refer to a switch connected to a steering wheel of the vehicle. For example, the switch may refer to a steering column switch connected to a steering wheel to control a function such as a headlight function or a wiper function of the vehicle.

The apparatus 1000 for operating the display type vehicle switch according to the embodiments may include the above-described display type vehicle switch or may be an apparatus for operating the display type vehicle switch. The apparatus may be located inside or outside the vehicle.

In general, a switch connected to a steering wheel of a vehicle may be produced or used while a symbol indicating a function of the vehicle is engraved in or printed on the switch. However, when the symbol is included in the switch through the method, there is a problem in that the symbol needs to be changed by reproducing or replacing the switch itself whenever a model of the vehicle is changed or software of the vehicle is updated.

Also, when the vehicle is driving or when the vehicle is being driven by a driver inexperienced in operating the above-described switch, the operation of the switch for performing a function suitable for a driving situation may not be performed. In this case, when the suitable operation of the switch is not performed, there is a problem in that the safety of the vehicle and/or the driver of the vehicle is threatened.

The apparatus according to the embodiments may continuously update a symbol indicating a function by using an apparatus for operating a display type switch connected to a steering wheel of a vehicle. Also, the apparatus may induce the user to operate a switch suitable for a driving situation of the vehicle.

An apparatus according to embodiments may include a receiver 1001, a highlight information generator 1002, and/or a controller 1003. The apparatus according to the embodiments may further include one or more elements not shown in FIG. 1.

The receiver according to embodiments may receive driving information related to an external driving situation of the vehicle and display state information of a vehicle display.

The driving information related to an external driving situation of the vehicle according to the embodiments may be information indicating the external situation of the vehicle and/or a state of the vehicle according to the external situation. For example, the driving information may include at least one of visibility limit information of the vehicle, current time information, speed information of the vehicle, or information on whether one or more controllers included in the vehicle are turned on. The driving information may be acquired by one or more sensors located outside or inside the vehicle.

The visibility limit information of the vehicle may indicate whether the field of view of a vehicle driver is limited due to weather outside the vehicle (e.g., fog or yellow sand). The visibility limit information may include either information indicating that the field of view is limited or information indicating that the field of view is not limited. For example, when a sensor of the vehicle does not recognize an object located at a separation distance greater than or equal to a preset separation distance, the visibility limit information of the vehicle may include information indicating that the field of view is limited.

The current time information may be information generated based on the current time. The current time information may include either day time information or night time information. For example, when the current time is in a range of from 18:00 to 06:00, the current time information may include night time information.

The speed information of the vehicle may be information indicating the speed of a vehicle currently driving. For example, the speed information of the vehicle may represent 60 km/h.

The information on whether one or more controllers included in the vehicle are turned on may be information indicating whether each controller performing a specific function of the vehicle is turned on or off. For example, the information on whether the one or more controllers are turned on may include at least one of information on whether a headlamp of the vehicle is turned on, information on whether a fog lamp of the vehicle is turned on, or information on whether a wiper of the vehicle is turned on.

The vehicle display (or display) may refer to a display included in the above-described switch. As described above, the display may display one or more symbols. The symbol may correspond to a controller that performs a function of the vehicle. For example, the symbol may represent a symbol for fog of a vehicle, a symbol for a wiper of the vehicle, or the like.

The display state information may represent information indicating the state of a symbol(s) displayed on the above-described display. The display state information may include information indicating whether or not a symbol for one or more controllers displayed on the display is highlighted. For example, the received display state information may include at least one of information on whether a symbol for a fog lamp is highlighted or information on whether a symbol for a wiper is highlighted.

A symbol displayed on the display may be highlighted. A highlighted symbol may indicate that a controller corresponding to the symbol needs to be turned on, but the controller is currently in a turned-off state. That is, when a specific controller needs to be turned on, the apparatus may highlight a symbol corresponding to the corresponding controller to induce a user (or driver) to select the highlighted symbol to turn on the corresponding controller.

A highlight indication information generator according to embodiments may generate highlight indication information of a symbol displayed on the display based on the received driving information and the received display state information.

The highlight indication information of the symbol displayed on the display may be information indicating the highlighting of the symbol as described above. The apparatus may induce the vehicle controller that performs a function corresponding to the highlighted symbol to be turned on through highlighting of the symbol displayed on the display. That is, the apparatus may induce the user to operate an appropriate switch through the highlighting of the symbol.

The controller according to embodiments may highlight the symbol displayed on the display based on the generated highlight information. In this regard, the apparatus may induce the user to operate the switch (e.g., select the corresponding symbol) through the highlighting of the symbol.

The apparatus according to the embodiments may identify a current state of the vehicle and highlighted states of symbols displayed on the display through the method described with reference to FIG. 1, and instruct highlighting of a symbol corresponding to a controller needed to be operated. The user may select the highlighted symbol and turn on a controller corresponding to the symbol. Thereby, the apparatus may induce the user to perform a necessary function of the current vehicle, thereby providing a safe driving.

Figure 2:
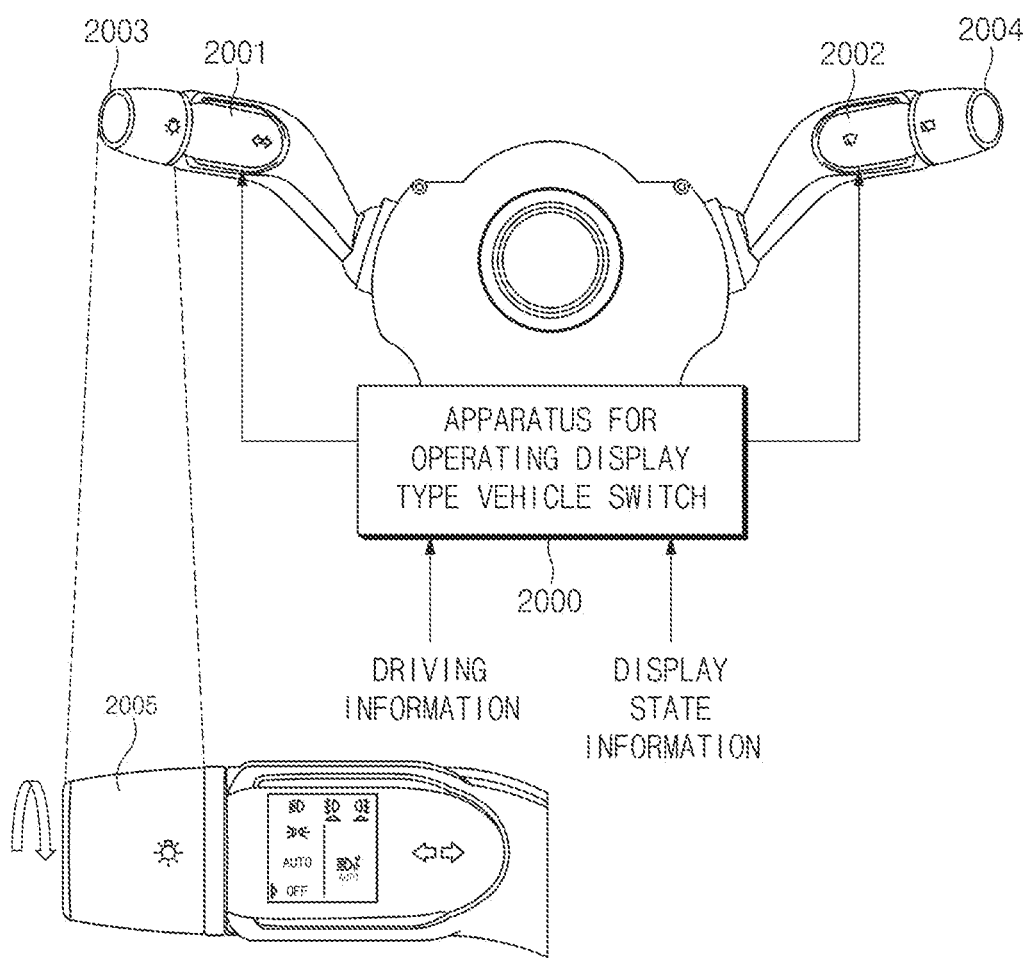
FIG. 2 shows an example of an apparatus for operating a display type vehicle switch according to embodiments.

FIG. 2 is a view showing an example of an apparatus for operating a display type vehicle switch (an apparatus 2000 described above with reference to FIG. 1) according to embodiments.

As described above with reference to FIG. 1, the apparatus 2000 may receive driving information and display state information. The apparatus may generate highlight indication information of a symbol displayed on displays 2001 and 2002 based on the received driving information and display state information. Also, the apparatus may highlight a symbol displayed on the display based on the generated highlight indication information.

The symbol described with reference to FIGS. 1 and 2 may be an image type icon or a text type icon displayed on the displays 2001 and 2002. One symbol may control turning-on or turning-off of a controller included in the vehicle. For example, the symbol may be a text type icon of text "AUTO". In this case, when the user selects a corresponding symbol, the function of a vehicle headlamp controller may be set to automatic lighting.

The user may select a symbol displayed on the display by using switches 2003 and 2004.

The switch according to the embodiments may be connected to the above-described display to be rotated. The user may select a symbol displayed on the display by rotating the switch connected to the display. For example, a symbol displayed on the display may be selected based on a rotation direction or a rotation angle of the switch.

The rotation direction according to embodiments may include a first direction and a second direction. The first direction according to embodiments may indicate a clockwise rotation direction of a shaft connecting the display and the switch. The second direction according to embodiments may indicate a counterclockwise rotation direction of the shaft connecting the display and the switch. That is, the switch may be rotated in one of the first direction and the second direction to select a symbol displayed on the display.

The user may select different symbols based on the rotation angle. The rotating switch may select different symbols according to a criterion for dividing 360 degrees into one or more stages. For example, 360 degrees in which the switch is rotated may be equally divided into four stages. In this case, when the switch is rotated by 40 degrees and when the switch is rotated by 100 degrees, the selected symbols may be different from each other.

For example, as shown in 2005, the user may select a symbol displayed on the display by rotating the switch in the first direction. Accordingly, the apparatus may turn on a controller corresponding to the selected symbol to perform the function of the controller.

The apparatus according to the embodiments may identify a current state of the vehicle and highlighted states of symbols displayed on the display through the method described with reference to FIG. 2, and instruct highlighting of a symbol corresponding to a controller needed to be operated. The user may select the highlighted symbol and turn on a controller corresponding to the symbol. Thereby, the apparatus may induce the user to perform a necessary function of the current vehicle, thereby providing a safe driving.

Figure 3:
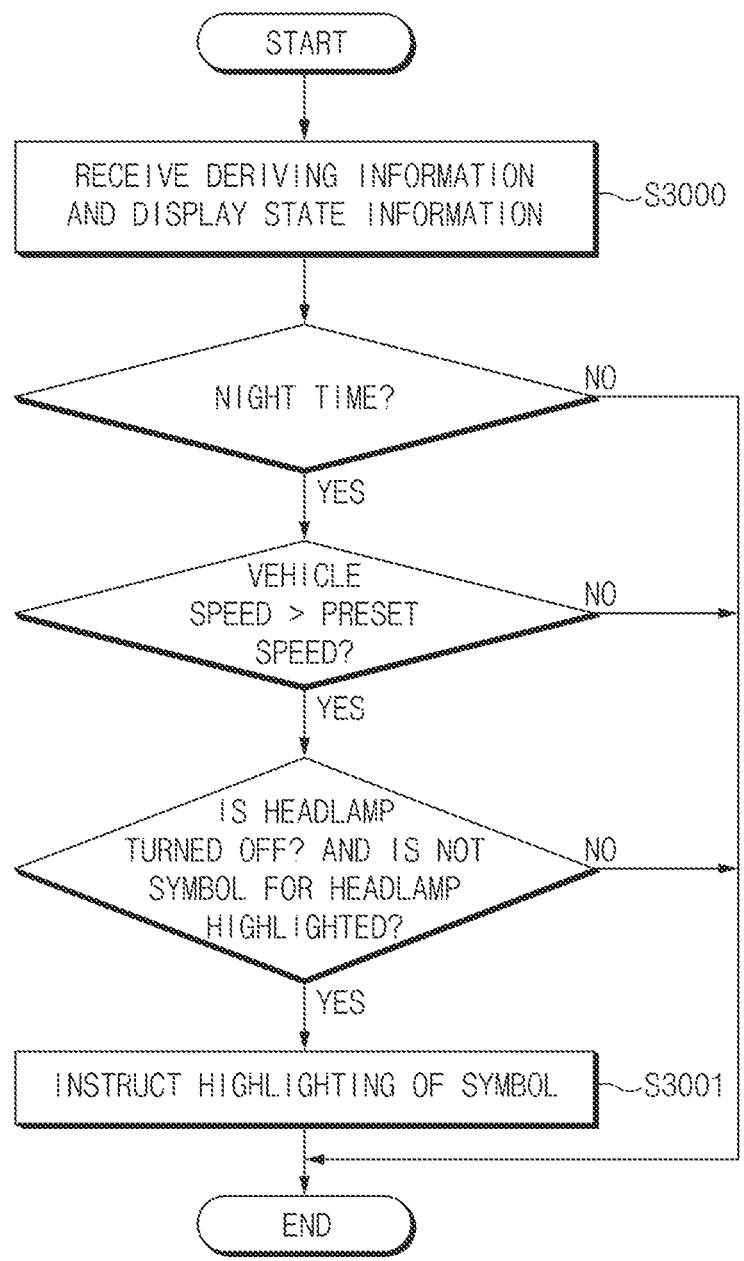
FIG. 3 shows an example of a method for highlighting a symbol displayed on a display according to embodiments.

FIG. 3 shows an example of a method for highlighting a symbol displayed on a display (or method) according to embodiments.

As described above with reference to FIGS. 1 and 2, a controller (the controller described above with reference to FIG. 1) may highlight a symbol displayed on a display based on generated highlight indication information. FIG. 3 may show an example of a method for generating highlight indication information.

A receiver (the receiver described above in FIG. 1) may receive driving information related to an external driving situation of the vehicle and display state information of a vehicle display (S3000). A detailed description of the driving information and the display state information is the same as or similar to that described above with reference to FIG. 1.

As described above with reference to FIG. 1, the highlight indication information may be generated based on driving information and display state information as described above.

For example, highlight indication information related to the symbol displayed on the display may include information indicating highlighting of a symbol in response to a case where current time information includes night time information, a case where vehicle speed information is greater than or equal to information indicating a preset value, a case where information indicating whether a vehicle headlamp is turned on includes information indicating that the headlamp is turned off, and a case where received display state information includes information indicating that a symbol for one or more controllers is not highlighted (S3001).

The preset value may be a value preset on a system or a value received from a user.

That is, a highlight indication information generator may generate information indicating the highlight of a symbol (e.g., a symbol for the headlamp) when a symbol for the headlamp of the vehicle is not highlighted on the display although a current time is night time, a vehicle speed is equal to or greater than a predetermined speed, and a headlamp of the vehicle is turned off.

Thereafter, the controller (the controller described above in FIG. 1) may highlight a corresponding symbol based on the generated highlight indication information.

The apparatus according to the embodiments may identify a current state of the vehicle and highlighted states of symbols displayed on the display through the method described with reference to FIG. 3, and instruct highlighting of a symbol corresponding to a controller needed to be operated. The user may select the highlighted symbol and turn on a controller corresponding to the symbol. Thereby, the apparatus may induce the user to perform a necessary function of the current vehicle, thereby providing a safe driving.

Figure 4:
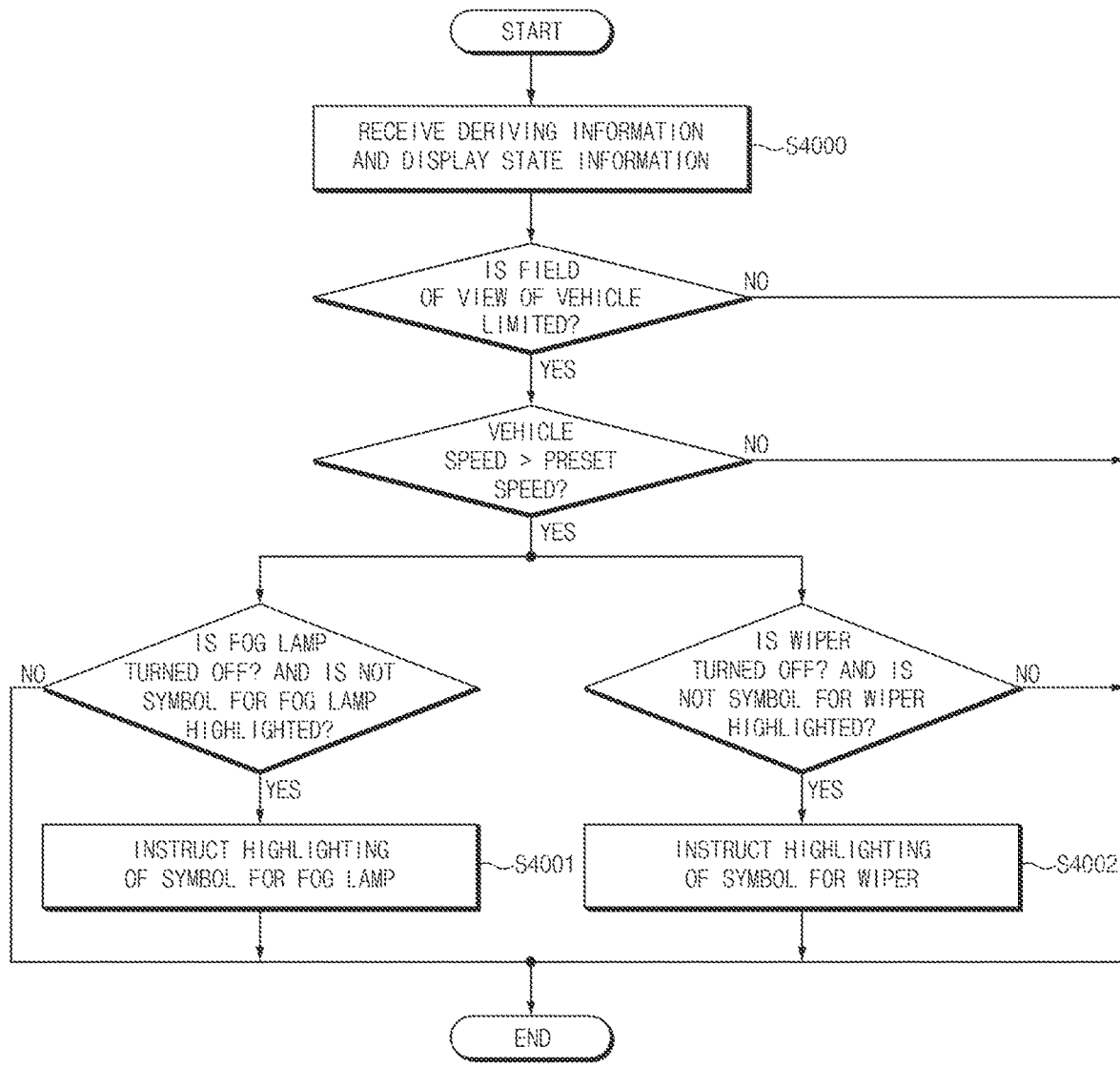
FIG. 4 shows an example of a method for highlighting a symbol displayed on a display according to embodiments.

FIG. 4 shows an example of a method for highlighting a symbol displayed on a display (or method) according to embodiments.

As described above with reference to FIGS. 1 and 2, a controller (the controller described above with reference to FIG. 1) may highlight a symbol displayed on a display based on generated highlight indication information. FIG. 4 may show an example of a method for generating highlight indication information.

A receiver (the receiver described above in FIG. 1) may receive driving information related to an external driving situation of the vehicle and display state information of a vehicle display (S4000). A detailed description of the driving information and the display state information is the same as or similar to that described above with reference to FIG. 1.

As described above with reference to FIG. 1, the highlight indication information may be generated based on driving information and display state information as described above.

For example, the highlight indication information of a symbol displayed on the display may include information indicating highlighting of a symbol for a fog lamp in response to a case where visibility limit information of the vehicle includes information indicating that a field of view is limited, a case where speed information of the vehicle is greater than or equal to information indicating a preset value, a case where information indicating whether a fog lamp is turned on includes information indicating that the fog lamp is turned off, and a case where information indicating whether a symbol for the fog lamp is highlighted includes information indicating that the symbol for the fog lamp is not highlighted (S4001).

Also, the highlight indication information of a symbol displayed on the display may include information indicating highlighting of a symbol for a wiper in response to a case where visibility limit information of the vehicle includes information indicating that a field of view is limited, a case where speed information of the vehicle is greater than or equal to information indicating a preset value, a case where information indicating whether a wiper is turned on includes information indicating that the wiper is turned off, and a case where information indicating whether a symbol for the wiper is highlighted includes information indicating that the symbol for the wiper is not highlighted (S4002).

A description of the preset value is the same as or similar to that described above with reference to FIG. 3.

That is, a highlight indication information generator may generate information indicating the highlighting of a symbol for the fog lamp when a symbol for the fog lamp of the vehicle is not highlighted on the display although a field of view of the vehicle is limited due to weather, a vehicle speed is equal to or greater than a predetermined speed, and the fog lamp of the vehicle is turned off.

In addition, a highlight indication information generator may generate information indicating the highlighting of the symbol for the wiper when a symbol for the wiper of the vehicle is not highlighted on the display although a field of view of the vehicle is limited due to weather, a vehicle speed is equal to or greater than a predetermined speed, and the wiper of the vehicle is turned off.

Thereafter, a controller (the controller described above with reference to FIG. 1) may highlight the symbol for the fog lamp based on the generated highlight indication information about the fog lamp. Also, the controller may highlight the symbol for the wiper based on the generated highlight indication information related to the wiper.

The apparatus according to the embodiments may identify a current state of the vehicle and highlighted states of symbols displayed on the display through the method described with reference to FIG. 4, and instruct highlighting of a symbol corresponding to a controller needed to be operated. The user may select the highlighted symbol and turn on a controller corresponding to the symbol. Thereby, the apparatus may induce the user to perform a currently-necessary function of the vehicle, thereby providing a safe driving.

Figure 5:
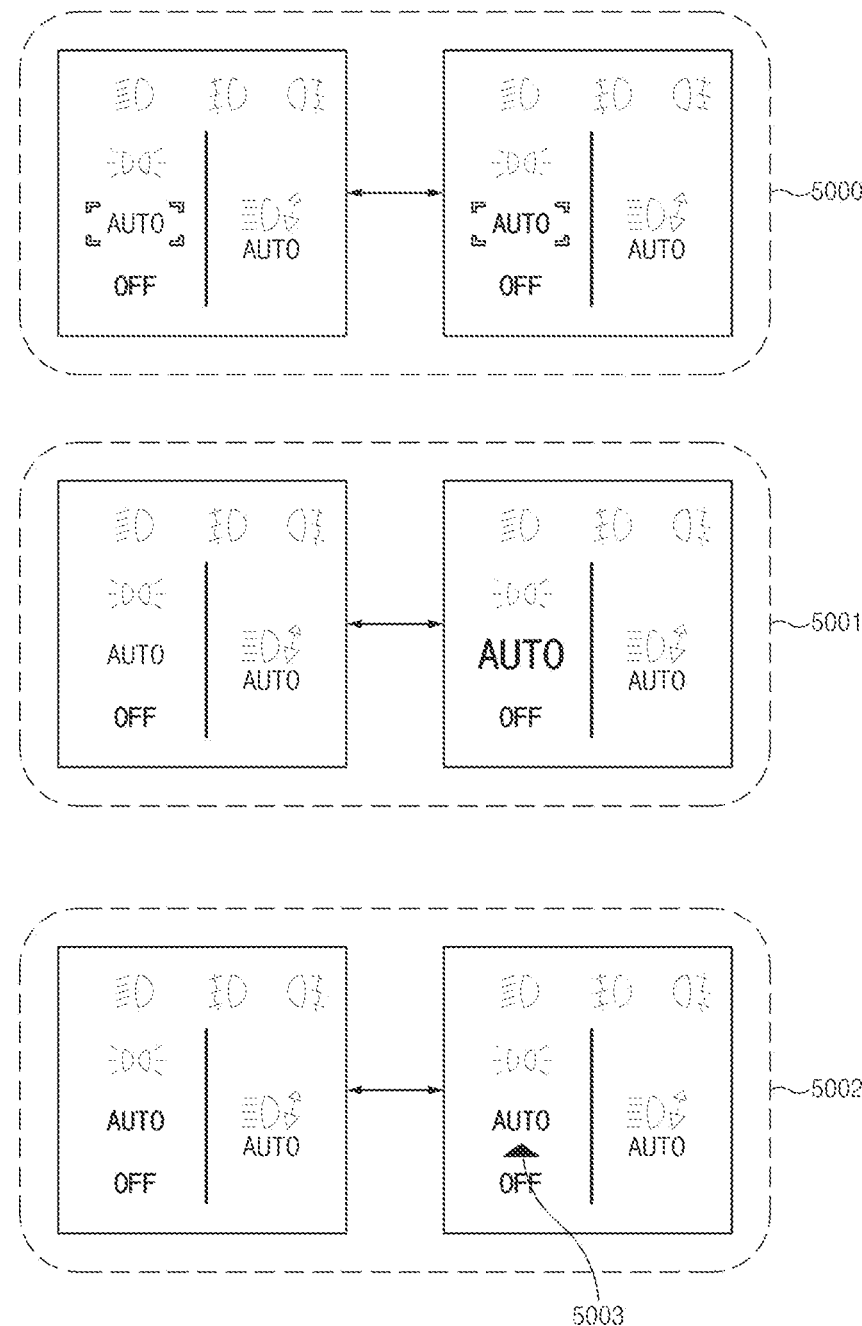
FIG. 5 shows an example of an operation for highlighting a symbol according to embodiments.

FIG. 5 shows an example of an operation for highlighting a symbol according to embodiments. A detailed description of the symbol and the highlighting of the symbol is the same as or similar to that described above with reference to FIGS. 1 to 4.

Reference numbers 5000 to 5002 represent diagrams for describing an example of a highlighting operation of a symbol according to embodiments. The operation of highlighting the symbol may be performed by one or more operations.

As described above with reference to FIG. 1, a controller (the controller described above with reference to FIG. 1) according to embodiments may highlight a symbol displayed on a display based on the generated highlight indication information. For example, the controller may highlight a symbol based on at least one of an operation of highlighting a symbol at preset time intervals, an operation of enlarging a size of a symbol, or an operation of displaying a sign for highlighting a symbol on a display.

Reference numeral 5000 may show an example of the operation of highlighting a symbol at preset time intervals. For example, as shown in 5000, the controller may highlight a symbol "AUTO" at a preset time interval. The preset time interval may be a preset time on a system or a time input by a user.

Reference numeral 5001 may show an example of the operation of enlarging the size of a symbol. For example, as shown in 5001, the size of the symbol "AUTO" when the symbol is not highlighted may be smaller than that when the symbol is highlighted. The magnification ratio (e.g., 2 times) of the symbol may be a time preset on the system or a value input by a user. The above-described magnification of the symbol may be performed at a preset time interval.

Reference numeral 5002 shows an example of an operation of displaying a symbol 5003 for highlighting a symbol on a display. For example, the controller may display an arrow-shaped symbol 5003 at the bottom of the symbol "AUTO" to highlight the symbol "AUTO". The display of the above-described symbol may be performed at preset time intervals.

The apparatus according to the embodiments may identify a current state of the vehicle and highlighted states of symbols displayed on the display through the method described with reference to FIG. 5, and instruct highlighting of a symbol corresponding to a controller needed to be operated. The user may select the highlighted symbol and turn on a controller corresponding to the symbol. Thereby, the apparatus may induce the user to perform a necessary function of the current vehicle, thereby providing a safe driving.

Figure 6:
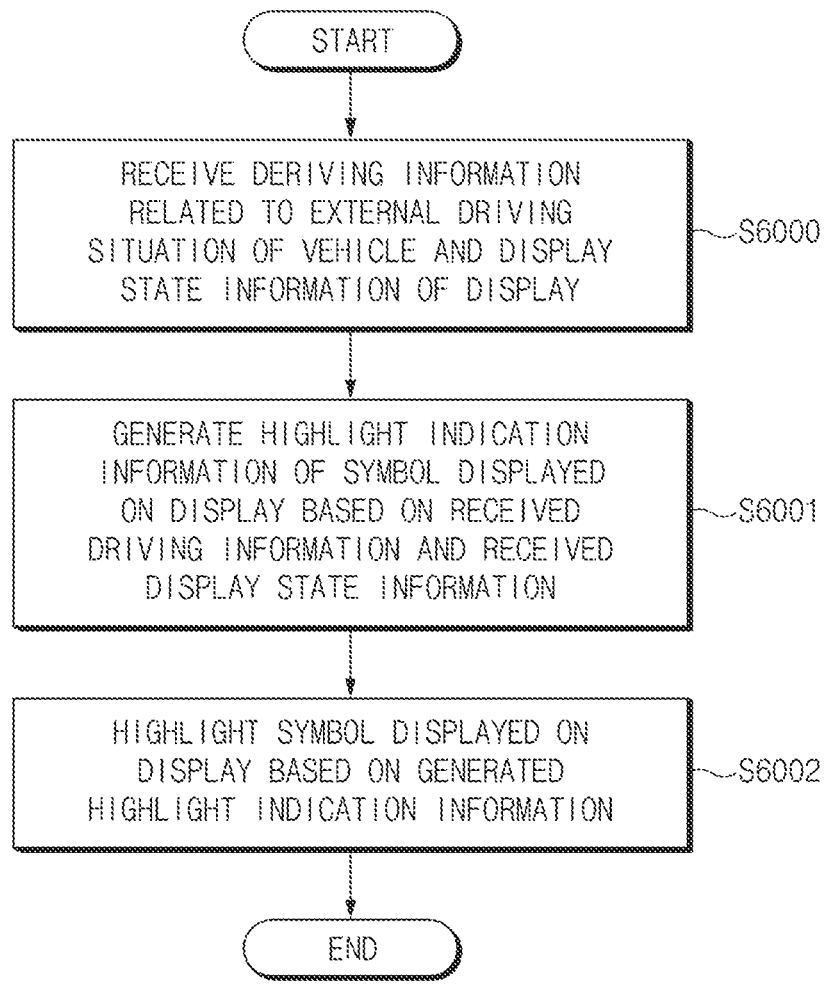
FIG. 6 shows an example of a method for operating a display type vehicle switch according to embodiments.

FIG. 6 shows an example of a method for operating a display type vehicle switch according to embodiments.

The apparatus described above with reference to FIGS. 1 to 5 may perform a method described with reference to FIG. 6.

A method according to the embodiments may include receiving driving information related to an external driving situation of the vehicle and display state information of a vehicle display (S6000), generating highlight indication information of a symbol displayed on the display based on the received driving information and the received display state information (S6001), and highlighting a symbol displayed on the display based on the generated highlight indication information (S6002). The method may further include one or more steps not described with reference to FIG. 6.

According to embodiments, the driving information may include at least one of visibility limit information of the vehicle, current time information, vehicle speed information, or information on whether one or more controllers included in the vehicle are turned on.

According to embodiments, the information on whether the one or more controllers are turned on may include at least one of information on whether a headlamp of the vehicle is turned on, information on whether a fog lamp of the vehicle is turned on, or information on whether a wiper of the vehicle is turned on.

The current time information according to embodiments may include either day time information or night time information. Also, the visibility limit information of the vehicle according to embodiments may include either information indicating that the field of view is limited or information indicating that the field of view is not limited.

The received display state information according to embodiments may include information indicating whether or not a symbol of the one or more controllers displayed on the display is highlighted.

The received display state information according to embodiments may include at least one of information on whether a symbol for a fog lamp is highlighted or information about whether a symbol for a wiper is highlighted.

According to embodiments, the highlight indication information related to the symbol displayed on the display may include information indicating highlighting of a symbol in response a case where current time information includes night time information, a case where vehicle speed information is greater than or equal to information indicating a preset value, a case where information indicating whether a vehicle headlamp is turned on includes information indicating that the headlamp is turned off, or received display state information includes information indicating that a symbol for one or more controllers is not highlighted.

According to embodiments, the highlight indication information of a symbol displayed on the display may include information indicating highlighting of a symbol for a fog lamp in response to a case where visibility limit information of the vehicle includes a field of view is limited, a case where speed information of the vehicle is greater than or equal to information indicating a preset value, a case where information indicating whether a fog lamp is turned on includes information indicating that the fog lamp is turned off, and a case where information indicating whether a symbol for the fog lamp is highlighted includes information indicating that the symbol for the fog lamp is not highlighted.

According to embodiments, the highlight indication information of a symbol displayed on the display may include information indicating highlighting of a symbol for a wiper in response to a case where visibility limit information of the vehicle includes a field of view is limited, a case where speed information of the vehicle is greater than or equal to information indicating a preset value, a case where information indicating whether a wiper is turned on includes information indicating that the wiper is turned off, and a case where information indicating whether a symbol for the wiper is highlighted includes information indicating that the symbol for the wiper is not highlighted.

According to the embodiments, S6002 may include an operation of highlighting a symbol based on at least one of an operation of highlighting a symbol at a preset time interval, an operation of enlarging the size of a symbol, or an operation of displaying a symbol for highlighting the symbol on the display.

Detailed descriptions for the driving information, the display state information, the symbol, highlighting of the symbol, and the highlight indication information of the symbol are the same as or similar to those described above with reference to FIGS. 1 to 5.

The above description is merely illustrative of the technical idea of the present disclosure, and various modifications and variations may be made without departing from the essential characteristics of the present disclosure by those skilled in the art to which the present disclosure pertains.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

According to embodiments, it is possible to continuously update a symbol indicating a function using a display type switch in an apparatus for operating a switch connected to a steering wheel of a vehicle.

In addition, according to the embodiments, it is possible to induce the user to operate an appropriate switch according to the driving situation of the vehicle.

In addition, various effects may be provided that are directly or indirectly understood through the disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a display type vehicle switch, comprising:
   a receiver configured to receive driving information related to an external driving situation of a vehicle and display state information of a display of the vehicle;
   a highlight indication information generator configured to generate highlight indication information of a symbol displayed on the display based on the received driving information and the received display state information;
   a controller configured to highlight the symbol displayed on the display based on the generated highlight indication information,
   wherein the highlight indication information includes information indicating highlighting of the symbol in response to a case where the received display state information includes information indicating that the symbol for the controller is not highlighted.

2. The apparatus of claim 1, wherein the driving information includes at least one of visibility limit information of the vehicle, current time information, speed information of the vehicle, or information on whether one or more controllers included in the vehicle are turned on.

3. The apparatus of claim 2, wherein the information on whether the one or more controllers are turned on includes at least one of information on whether a headlamp of the vehicle is turned on, information on whether a fog lamp of the vehicle is turned on, or information on whether a wiper of the vehicle is turned on.

4. The apparatus of claim 3, wherein the current time information includes one of day time information or night time information,
   wherein the visibility limit information of the vehicle includes one of information indicating that a field of view is limited or information indicating that the field of view is not limited.

5. The apparatus of claim 4, wherein the received display state information includes information indicating whether or not a symbol of the one or more controllers displayed on the display is highlighted.

6. The apparatus of claim 5, wherein the highlight indication information of the symbol displayed on the display includes information indicating highlighting of the symbol in response to a case where the current time information includes night time information, a case where vehicle speed information is greater than or equal to information indicating a preset value, and a case where information indicating whether a vehicle headlamp is turned on includes information indicating that the headlamp is turned off.

7. The apparatus of claim 4, wherein the received display state information includes one of information indicating whether a symbol for the fog lamp is highlighted or information indicating whether a symbol for the wiper is highlighted.

8. The apparatus of claim 7, wherein the highlight indication information of the symbol displayed on the display includes information indicating highlighting of the symbol for the fog lamp in response to a case where the visibility limit information of the vehicle includes information indicating that a field of view is limited, a case where the speed information of the vehicle is greater than or equal to information indicating a preset value, a case where information indicating whether the fog lamp is turned on includes information indicating that the fog lamp is turned off, and a case where information indicating whether the symbol for the fog lamp is highlighted includes information indicating that the symbol for the fog lamp is not highlighted.

9. The apparatus of claim 7, wherein the highlight indication information of the symbol displayed on the display includes information indicating highlighting of the symbol for the wiper in response to a case where the visibility limit information of the vehicle includes information indicating that a field of view is limited, a case where the speed information of the vehicle is greater than or equal to information indicating a preset value, a case where information indicating whether the wiper is turned on includes information indicating that the wiper is turned off, and a case where information indicating whether the symbol for the wiper is highlighted including information indicating that the symbol for the wiper is not highlighted.

10. The apparatus of claim 1, wherein the controller is configured to highlight the symbol based on at least one of an operation of highlighting the symbol at preset time intervals, an operation of enlarging a size of the symbol, or an operation of displaying a sign for highlighting the symbol on the display.

11. A method for operating a display type vehicle switch, comprising:
    receiving, by a receiver, driving information related to an external driving situation of a vehicle and display state information of a display of the vehicle;
    generating, by a highlight indication information generator, highlight indication information of a symbol displayed on the display based on the received driving information and the received display state information; and
    highlighting, by a controller, the symbol displayed on the display based on the generated highlight indication information,
    wherein the highlight indication information includes information indicating highlighting of the symbol in response to a case where the received display state information includes information indicating that the symbol for the controller is not highlighted.

12. The method of claim 11, wherein the driving information includes at least one of visibility limit information of the vehicle, current time information, vehicle speed information, or information on whether one or more controllers included in the vehicle are turned on.

13. The method of claim 12, wherein the information indicating whether the one or more controllers are turned on includes at least one of information on whether a headlamp of the vehicle is turned on, information on whether a fog lamp of the vehicle is turned on, or information on whether a wiper of the vehicle is turned on.

14. The method of claim 13, wherein the current time information includes one of day time information or night time information, and
    wherein the visibility limit information of the vehicle includes one of information indicating that a field of view is limited or information indicating that the field of view is not limited.

15. The method of claim 14, wherein the received display state information includes information indicating whether or not a symbol of the one or more controllers displayed on the display is highlighted.

16. The method of claim 15, wherein the highlight indication information of the symbol displayed on the display includes information indicating highlighting of the symbol in response to a case where the current time information includes night time information, a case where vehicle speed information is greater than or equal to information indicating a preset value, and a case where information indicating whether a vehicle headlamp is turned on includes information indicating that the headlamp is turned off.

17. The method of claim 14, wherein the received display state information includes one of information indicating whether a symbol for the fog lamp is highlighted or information indicating whether a symbol for the wiper is highlighted.

18. The method of claim 17, wherein the highlight indication information of the symbol displayed on the display includes information indicating highlighting of the symbol for the fog lamp in response to a case where the visibility limit information of the vehicle includes information indicating that a field of view is limited, a case where the speed information of the vehicle is greater than or equal to information indicating a preset value, a case where information indicating whether the fog lamp is turned on includes information indicating that the fog lamp is turned off, and a case where information indicating whether the symbol for the fog lamp is highlighted includes information indicating that the symbol for the fog lamp is not highlighted.

19. The method of claim 17, wherein the highlight indication information of the symbol displayed on the display includes information indicating highlighting of the symbol for the wiper in response to a case where the visibility limit information of the vehicle includes information indicating that a field of view is limited, a case where the speed information of the vehicle is greater than or equal to information indicating a preset value, a case where information indicating whether the wiper is turned on includes information indicating that the wiper is turned off, and a case where information indicating whether the symbol for the wiper is highlighted including information indicating that the symbol for the wiper is not highlighted.

20. The method of claim 11, wherein the highlighting of the symbol includes highlighting the symbol based on at least one of an operation of highlighting the symbol at preset time intervals, an operation of enlarging a size of the symbol, or an operation of displaying a sign for highlighting the symbol on the display.

* * * * *